United States Patent
Chen et al.

(10) Patent No.: US 10,443,154 B2
(45) Date of Patent: Oct. 15, 2019

(54) POLY(LACTIC ACID) MEMBRANE AND METHOD OF MAKING THE MEMBRANE

(71) Applicants: PURAC BIOCHEM BV, Gorinchem (NL); NINGBO INST. OF MATRL. TECH. & ENG., CHINESE ACA. OF SCIENCES (NIMTE CN), Ningbo, Zhejiang (CN)

(72) Inventors: Peng Chen, Ningbo (CN); Wei Huang, Ningbo (CN)

(73) Assignees: PURAC BIOCHEM B.V., Gorinchem (NL); NINGBO INSTITUTE OF MATERIALS TECHNOLOGY AND ENGINEERING, CHINESE ACADEMY OF SCIENCES (NIMTE CN), Zhejiang (CN)

( * ) Notice: Subject to any disclaimer, the term of this patent is extended or adjusted under 35 U.S.C. 154(b) by 190 days.

(21) Appl. No.: 15/302,197

(22) PCT Filed: Apr. 7, 2015

(86) PCT No.: PCT/EP2015/057510
§ 371 (c)(1),
(2) Date: Oct. 6, 2016

(87) PCT Pub. No.: WO2015/155182
PCT Pub. Date: Oct. 15, 2015

(65) Prior Publication Data
US 2017/0029981 A1    Feb. 2, 2017

(30) Foreign Application Priority Data
Apr. 10, 2014    (CN) .......................... 2014 1 0142731

(51) Int. Cl.
*D04H 3/16*    (2006.01)
*D01F 6/62*    (2006.01)
(Continued)

(52) U.S. Cl.
CPC ............. *D01F 6/625* (2013.01); *D04H 3/011* (2013.01); *D04H 3/016* (2013.01)

(58) Field of Classification Search
CPC ......... D01F 6/625; D04H 3/011; D04H 3/016
See application file for complete search history.

(56) References Cited

U.S. PATENT DOCUMENTS 3,574,523 A * 4/1971 Hudson et al. .......... D04H 1/54
156/305
3,814,622 A * 6/1974 Isshiki et al. ......... D06M 15/31
427/354

(Continued)

FOREIGN PATENT DOCUMENTS

CN    1994476 A    7/2007
CN    101327345 A    12/2008
(Continued)

OTHER PUBLICATIONS

Tsuji et al., "Electrospinning of Poly(lactic acid) Stereocomplex Nanofibers", Biomacromolecules 2006, 7, 3316-3320 (Year: 2006).*
(Continued)

*Primary Examiner* — Galen H Hauth
(74) *Attorney, Agent, or Firm* — Oliff PLC

(57) ABSTRACT

A polylactic acid nano-fiber membrane and preparation method thereof. In particular, the membrane has PLA nanofibers with an average diameter between 50 nm and 200 nm, wherein the nanofibers contain a crystal phase with a volume fraction between 45% and 85% and the crystal phase contains PLA stereocomplex crystals with a volume fraction between 85% and 95%. The method of preparation includes mixing dried PDLA and PLLA in a specific PLLA/PDLA ratio of between 95/5 and 99/1; producing continuous fibers or nonwovens in a extrusion and spinning device, and producing woven fabrics or nonwovens with the continuous fibers; heat treating the woven fabrics or nonwovens; wash- (Continued)

ing the heat treated woven fabrics or nonwovens with a solvent; removing the solvent and drying the woven fabrics or nonwovens; and pressing the dried woven fabrics or nonwovens for making the membrane.

8 Claims, 2 Drawing Sheets

(51) Int. Cl.
  *D04H 3/011* (2012.01)
  *D04H 3/016* (2012.01)

(56) References Cited

U.S. PATENT DOCUMENTS

| | | | | |
|---|---|---|---|---|
| 2008/0038976 | A1* | 2/2008 | Berrigan | D04H 3/00 442/327 |
| 2012/0040582 | A1* | 2/2012 | Topolkaraev | D01D 5/38 442/334 |

FOREIGN PATENT DOCUMENTS

| | | |
|---|---|---|
| CN | 101401955 A | 4/2009 |
| CN | 102086565 A | 6/2011 |
| EP | 1 731 633 A1 | 12/2006 |
| EP | 2 060 665 A1 | 5/2009 |
| EP | 2 644 191 A1 | 10/2013 |
| JP | 2003-105629 A | 4/2003 |
| JP | 2003-286640 A | 10/2003 |
| JP | 2007-231480 A | 9/2007 |
| JP | 2008-115503 A | 5/2008 |

OTHER PUBLICATIONS

Midori Takasaki et al, "Development of Stereocomplex Crystal of Polyactide in High-Speed Melt Spinning and Subsequent Drawing and Annealing Processes", Journal of Macromolecular Science, 2003, pp. 403-420, vol. B42.

Aug. 24, 2015 International Search Report issued in Internatiol Patent Application No. PCT/EP2015/057510.

* cited by examiner

A)  Grayscale

B)  Black and white

POLY(LACTIC ACID) MEMBRANE AND METHOD OF MAKING THE MEMBRANE

FIELD OF THE INVENTION

The invention is in the field of polymer material technology, and relates to a polylactic acid nano-fiber membrane and preparation method thereof.

BACKGROUND OF THE INVENTION

Polylactic acid is known as one of bio-based degradable polymers with great potential of application. Polylactic acid can be applied in bioengineering, health care and other fields for its good biocompatibility and biodegradability. Particularly, polylactic acid fiber membranes can be used for a cosmetic (e.g. a facial mask), a drug controlled release carrier, a tissue repair bracket, an anti-adhesion membrane for operation, a wound membrane, artificial tissues or organ template (artificial bone, artificial nerve conduit, artificial blood vessel, etc.) and so on, and can be used for filtering and absorbing heavy metals and other toxic substances as well. For these applications, polylactic acid fiber membranes are required to have low enough fiber diameters to varying degrees, optimally nano-scale, for increase in specific surface area and reduction of the pore diameter of the fiber membranes. Additionally, for packing, transportation, storage, sterilization, etc., polylactic acid fiber membranes are required to have high enough thermal resistance and optimally maintain stability of dimension and performance during medical sterilization at a temperature above 120° C.

Most of developed polylactic acid nano-fiber membranes are prepared via the electro-spinning method. Chinese patent application with Publication Number of CN1994476A discloses a medical polylactic acid composite nano-membrane prepared via the electro-spinning method, and sterilized via the Co-60 radiation sterilization method; Chinese patent application with Publication Number of CN101327345A discloses a polylactic acid/polyhydroxyalkanoate compounding fiber membrane prepared with the electro-spinning method, wherein the fiber diameter is 20 to 600 nm and the pore diameter of the porous membrane is 100 nm to 10 μm; Chinese patent application with Publication Number of CN101401955A discloses a levorotatory polylactic acid nano-fiber membrane prepared via the electro-spinning method, wherein the fiber diameter is 50 to 500 nm and the porosity factor of membrane is more than 90%; and Chinese patent application with Publication Number of CN102086565A discloses a polylactic acid anti-microbial nano-fiber membrane and preparation method thereof, wherein the polylactic acid anti-microbial nano-fiber membrane is prepared by adding an antibacterial agent to the polylactic acid with the electro-spinning method.

Although polylactic acid nano-fiber membranes can be prepared with the above disclosed technologies, the following limitations exist: (1) under the current technical conditions, the electro-spinning has low production efficiency and complicated process requirements; and (2) a method for improving thermal resistance of the polylactic acid membrane has not been put forward. It is well known that poor thermal resistance is one of the major defects of polylactic acid. Polylactic acid is also known in the art as polylactide. A conventional polylactic acid fiber has more than 10% boiling water shrinkage, which results in serious deformation of the polylactic acid fiber when temperature is more than 100° C., with great restrictions on its application.

It has been revealed that poly(L-lactide) (PLLA) doped with enantiomeric poly(D-lactide) (PDLA) could form a racemic stereocomplex crystal by compounding crystallization. Since the stereocomplex crystal shows a melting point of 40 to 70° C. higher than that of homocrystalline polylactic acid, it is highly expected to improve thermal resistance of polylactic acid products by forming the racemic stereocomplex crystal. Takasaki et al. (J. Macromol. Sci., Pt.B-Phys. 2003, B42:403) prepared a compounding fiber containing equal amounts of poly(L-lactide) and poly(D-lactide) molecules with a melt spinning method. Although the racemic stereocomplex crystal is formed at take-up velocity of 1000 to 7500 m/min, the fiber showed more than 10% shrinkage at 100° C., indicating that its thermal resistance was unsatisfactory.

Therefore, forming a racemic stereocomplex crystal in polylactic acid is not a sufficient condition for a significant improvement of its thermal resistance. In other words, the heat resistance of polylactic acid products such as nano-fiber membranes is not necessarily to be improved even though a racemic stereocomplex crystal is formed. At the same time, a racemic stereocomplex crystal formed with the known technologies requires that poly(L-lactide) is present in the same or similar amounts than poly(D-lactide), namely poly (D-lactide) is about 50% of the raw materials. However, poly(D-lactide) is much more expensive than the poly(L-lactide), so such methods are uneconomic due to significant increase in material cost. Therefore, it is necessary to develop a new polylactic acid nano-fiber membrane and a preparation method thereof to meet the higher requirements for its overall performance during its application, including heat resistance.

SUMMARY OF THE INVENTION

The first purpose of the invention is to provide a polylactic acid nano-fiber membrane according to above state of the art. A polylactic acid membrane according to the invention (also referred to as nano-fiber membrane) comprises polylactic acid (PLA) nanofibers with an average diameter (also referred to as mean diameter) of between 50 and 200 nm;

The polylactic acid nano-fiber membrane has an average thickness (mean thickness) between 5 μm and 55 μm, an average porosity (mean porosity) between 75% and 85% and an average pore size (mean pore diameter) between 0.1 μm and 1 μm;

The polylactic acid nanofibers in the membrane contain a crystal phase with a volume fraction between 45% and 85% and the crystal phase contains PLA stereocomplex crystals with a volume fraction between 85% and 95%. In other words, the degree of crystallization of the polylactic acid nanofibers is 45%-85%, and preferably 65%-85%, the racemic stereocomplex crystal of polylactic acid has 85%-95% content in the fiber membrane crystal area.

Another purpose of the invention is to provide a preparation method for the polylactic acid nano-fiber membrane.

The method according to invention comprises following steps:

Step (1). drying poly(L-lactic acid) (also referred to in the art as poly L-lactide or PLLA) and poly(D-lactic acid) (also referred to in the art as poly D-lactide or PDLA), respectively, preferably in vacuum;

The weight-average molecular weight of the poly(L-lactide)(PLLA) is between 60,000 and 600,000, wherein the molar content of L optical isomer (L-isomer mole concentration) is between 93% and 99%; the weight-average molecular weight of the poly(D-lactide) (PDLA) is between 60,000 and 600,000, wherein the molar content of D optical isomer (D-isomer mole concentration) is between 93% and 99%;

Preferably, the weight-average molecular weight of the poly(L-lactide) (PLLA) is between 60,000 and 120,000, wherein the molar content of L optical isomer is between 93% and 99%; the weight-average molecular weight of the poly(D-lactide) (PDLA) is between 360,000 and 600,000, wherein the molar content of D optical isomer is between 93% and 99%;

Step (2). Physically mixing the dried poly(L-lactide) and the dried poly(D-lactide) (in dry state) to form a mixture; 100 mass fractions of mixture are prepared by 95-99 fractions of the poly(L-lactide) and 1-5 fractions of the poly(D-lactide), i.e. mixing the dried PLLA with the dried PDLA at a PLLA/PDLA ratio of between 95/5 and 99/1;

Step (3). Injecting the mixture into extrusion equipment with a heater for melt spinning (e.g. transferring the mixed PLLA/PDLA into a heated melt extrusion and spinning device) at between 215 and 245° C. spinning temperature and between 500 and 4500 m/min spinning speed (also referred to as take-up speed) to obtain polylactic acid fibers with an average diameter (mean diameter) between 10 and 50 μm, and then prepare a polylactic acid fabric (in particular a woven fabric) or nonwoven with an average weight between 15 and 65 g/m$^2$; Preferably, the spinning speed (take-up speed) is between 2500 and 4500 m/min.

Step (4). Performing a thermal treatment for the polylactic acid (woven) fabric or nonwoven for a time period between 10 and 50 s at a temperature between 160 and 200° C., and quench to room temperature (e.g. to below 55° C.) within a time period between 5 and 15 s;

Preferably the temperature for thermal treatment is 180-200° C. and the time for thermal treatment is 10-30 s;

Step (5). Dipping (e.g. fully immerse) the polylactic acid (woven) fabric or nonwoven treated thermally in Step (4) into a solvent (for washing) at a temperature between 25 and 135° C. for a time period between 15 and 105 min;

The solvent may be dichloromethane, 1,2-dichloroethane, trichloromethane (also known as chloroform), tetrahydrofuran (also known as oxolane), 1,4-dioxane, 1,1,1,2-tetrachloroethane, or 1,1,2,2-tetrachloroethane;

Step (6). Removing the solvent from the (woven) fabrics or nonwovens and drying. For instance, after taking out the polylactic acid (woven) fabric or nonwoven washed in Step (5) from the solvent, pressing the (woven) fabrics or nonwovens under a pressure between 0.12 and 0.28 MPa (to partially remove the solvent), and drying at a temperature between 60 and 80° C. (to remove the residual solvent); or dipping (e.g. fully immersing) the (woven) fabrics or nonwovens into an extraction agent at a temperature between 25 and 55° C. for a time period between 1 and 5 min, then pressing under a pressure between 0.12 and 0.28 MPa and drying at a temperature between 60 and 120° C. (to remove the residual solvent and the extraction agent);

The extraction agent may be, e.g., water or ethyl alcohol;

Step (7). Pressing the dried polylactic acid (woven) fabric or nonwoven for making the polylactic acid nano-fiber membrane with an average thickness between 5 and 55 μm under a pressure between 0.2 and 0.4 MPa and at a temperature between 25 and 75° C. In the method according to the invention, the polylactic acid fiber is prepared by judicious selection of molecular weight of the poly(L-lactide) and poly(D-lactide), and content and mixing ratio of the optical isomer at proper spinning temperature and take-up speed. Under above specific conditions such as preferable material component and strong stretch flow field, a small quantity of the poly(D-lactide) interacts with the poly(L-lactide), and polylactic acid nanofibers (50-200 nm mean diameter) distributed in the conventional polylactic acid substrate are generated in situ in the forming of the polylactic acid fiber. The nano-fiber has a melting point which is 40-70° C. higher than that of the common polylactic acid, and is also insoluble in conventional polylactic acid solvents such as dichloromethane, etc. The invention takes advantages of these characteristics and, after repeated tests, provides a technical solution to prepare a polylactic acid nano-fiber membrane (which comprises and, may preferably consists of, the nanofibres) by melt spinning, thermal treatment, washing, extraction, drying, hot-pressing. The polylactic acid nano-fiber membrane prepared in the method according to the invention is of a high degree of crystallization (45%-85%, even 65%-85%), and the most (85%-95%) of its crystal component is the racemic stereocomplex crystal of polylactic acid. In particular, said nanofibers contain a crystal phase with a volume fraction between 45% and 85% and the crystal phase contains PLA stereocomplex crystals with a volume fraction between 85% and 95%.

Therefore, it has the melting point 40-70° C. higher than that of the common polylactic acid, and excellent heat resistance, and is also insoluble in conventional polylactic acid solvents such as the dichloromethane, etc.

The technical solution according to the invention has following advantages: (1) the raw material comprises a small proportion of the poly(D-lactide) and high proportion of the poly(L-lactide), so the cost is reduced significantly in comparison with equal mix of poly(L-lactide) and poly(D-lactide) in routine techniques; (2) the molecular structure parameters of the poly(L-lactide) and poly(D-lactide) are optimized (molecular weight and content of optical isomer), particularly when the molecular weight of the poly(D-lactide) is 3 times molecular weight of the poly(L-lactide), the molecular chains of a small proportion of the poly(D-lactide) with high molecular weight are assembled automatically with the molecular chains of the poly(L-lactide) under an intensive elongational flow field after uncoiling and orientation to produce a nano-fiber with more regular structure and higher degree of crystallization, the main component of which is the racemic stereocomplex crystal of polylactic acid with higher melting point and excellent heat resistance; (3) the melt spinning method adopted has far higher production efficiency than the conventional electrospinning method, and existing melt spinning equipment, which is well developed, can be used for production; (4) higher spinning speed (also referred to in the art as take-up speed) provides not only the production efficiency but also strong enough elongational flow field to ensure that the diameter of the nanofibers, the degree of crystallization of the nanofiber membrane and the content of the racemic stereocomplex crystal meet the requirements of the invention; (5) by the thermal treatment of the polylactic acid (woven) fabric or nonwoven, the common polylactic acid crystal produced during spinning (calculated as per α crystal) is partially or wholly melted to amorphous state while the racemic stereocomplex crystal of polylactic acid is kept intact; (6) the polylactic acid nanofiber and nanofiber membrane with such main component as the racemic stereocomplex crystal are obtained by washing, extraction and drying for removal of conventional polylactic acid substrate; and (7) the good form and performance of the polylactic acid nano-fiber membrane are guaranteed by hot-pressing.

The polylactic acid nano-fiber membrane prepared in the method according to the invention comprises, or may preferably consist of, the polylactic acid nanofibers, which have a mean diameter of between 50 and 200 nm, a high degree of crystallization and comprises the racemic stereocomplex crystal as the main component. The nanofibers are generated in situ (within the polylactic acid fibers) in the processing of melt spinning at higher speed, and have even shape and dimensions as well as higher degree of orientation and crystallization, and strikingly higher performance than common polylactic acid fibers. Therefore, the polylactic acid nano-fiber membrane according to the invention has good thermal resistance, maintains stability of dimension and performance at temperature above 120° C., breaks through the performance bottleneck of the conventional polylactic acid nano-fiber membrane, thereby meeting usage requirements and expanding its fields of application.

IMPLEMENTATION OF THE INVENTION

The following further describes the technical solution according to the invention and its advantages by several embodiments. Among the measured parameters, the mean diameter of the fiber or the nanofiber is measured by a scanning electronic microscope (SEM); the melting point is measured by the differential scanning calorimetry (DSC); and the degree of crystallization and the content of racemic stereocomplex crystal are measured by the wide angle X-ray diffraction (WAXD). The degree of crystallization and the content of racemic stereocomplex crystal are not measured by DSC because it is well-known that it is required to heat the sample during measuring by the DSC, which results in secondary crystallization, so the measured value of crystallization is higher than the true value.

Figure 1:
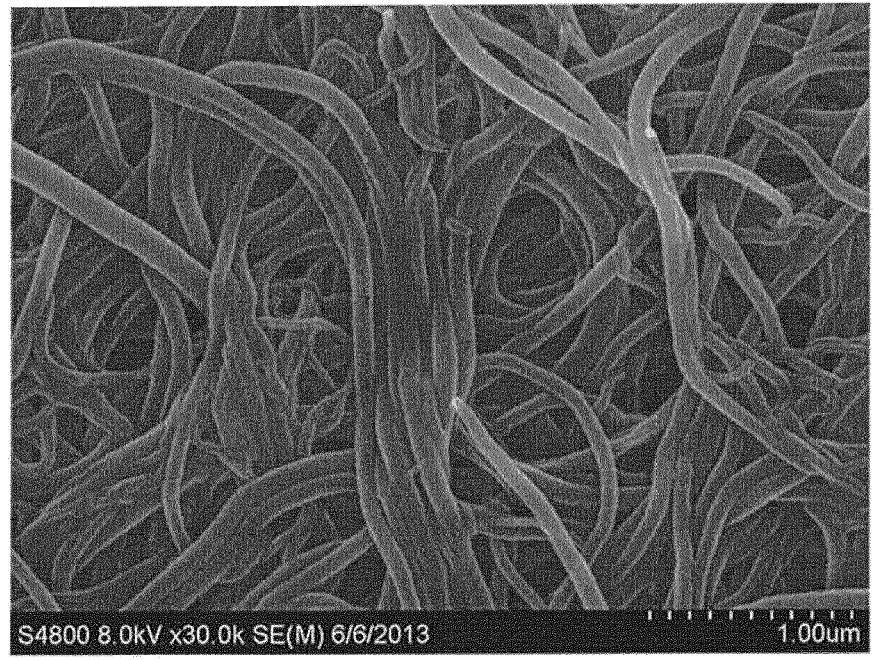
FIG. 1 shows SEM image of the polylactic acid nano-fiber membrane prepared in Embodiment 1.
Figure 1:
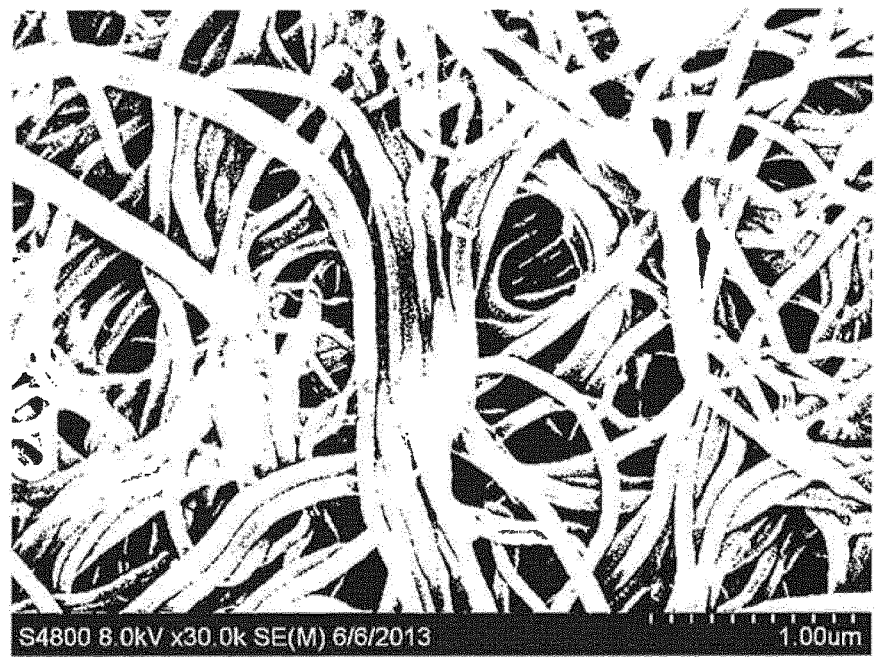
Figure 2:
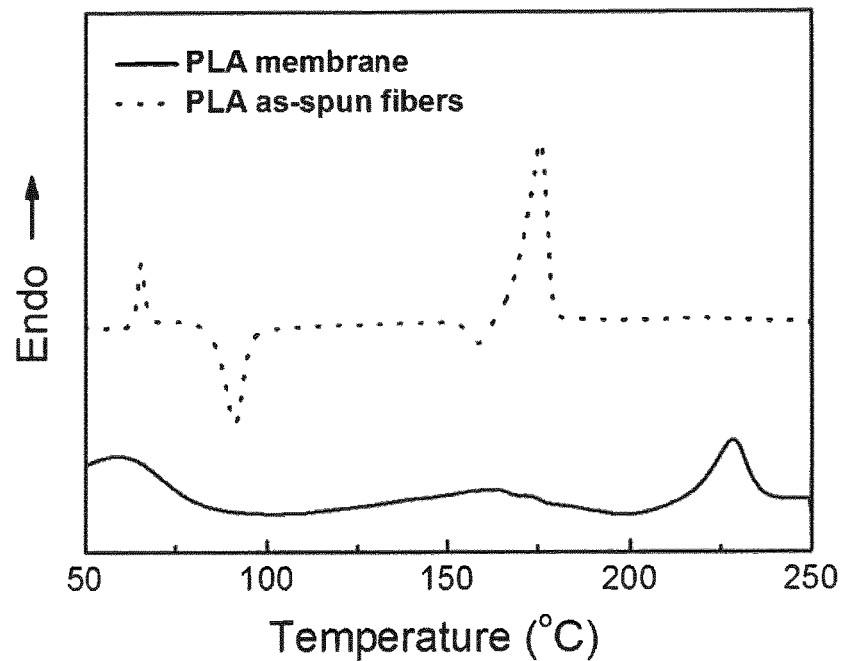
FIG. 2 shows DSC curve of the polylactic acid nano-fiber membrane prepared in Embodiment 1.
Figure 3:
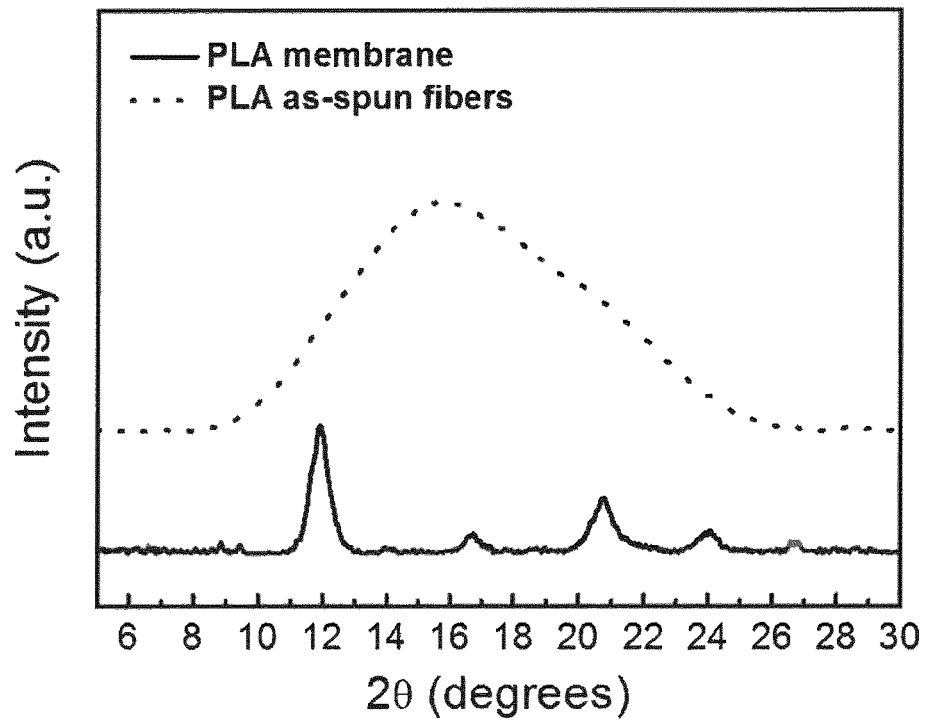
FIG. 3 shows WAXD of the polylactic acid nano-fiber membrane prepared in Embodiment 1.

Embodiment 1:

Poly(L-lactide) with 90000 weight-average molecular weight and 96% molar content of L optical isomer, and poly(D-lactide) with 480000 weight-average molecular weight and 99% molar content of D optical isomer were vacuum dried under conditions such as 70±5° C. drying temperature, 16 h drying time and 100 Pa vacuum degree; 99 kg dried poly(L-lactide) and 1 kg dried poly(D-lactide) were physically mixed in dry state in a high speed mixer; the mixture was injected into a single screw extruder for melting, the mixture was extruded through a metering pump and a spinneret orifice, polylactic acid fibers with 50 μm mean diameter were collected when the spinning temperature was 230° C. and the take-up speed was 2500 m/min, and a spunlace nonwoven was prepared with a weight of 65 g/m²; the nonwoven was passed through 6 m long and 180° C. constant temperature oven at 7.2 m/min for thermal treatment of 50 s, and guided into 10° C. cold bath for quenching below 55° C. within 10 s, and a measurement with wide angle X-ray diffraction (WAXD) showed that the crystallinity of a crystal of the treated nonwoven is 0; the treated nonwoven was immediately immersed into 80° C. 1,2-dichloroethane for washing for 60 min, pre-pressed at 0.28 MPa to partially remove the solvent, and fully dried at 80° C.; and pressed into a polylactic acid nano-fiber membrane at 0.4 MPa and 50° C. Tests showed that, as shown in FIG. 1, the membrane consists of polylactic acid nanofibers with 50 nm mean diameter, is insoluble in conventional polylactic acid solvents such as 1,2-dichloromethane, etc., can maintain stability of dimension and performance at 120° C., and has 55 μm mean thickness, 75% mean porosity factor and 0.1 μm mean pore diameter; as shown in FIG. 2, a melting peak appeared at about 228° C.; and as shown in FIG. 3, the WAXD measurement showed that the crystallinity is 85%, 95% of which is the racemic stereocomplex crystal of polylactic acid.

Embodiment 2:

Poly(L-lactide) with 60000 weight-average molecular weight and 93% molar content of L optical isomer, and poly(D-lactide) with 600000 weight-average molecular weight and 96% molar content of D optical isomer were vacuum dried under conditions such as 70±5° C. drying temperature, 16 h drying time and 100 Pa vacuum degree; 97 kg dried poly(L-lactide) and 3 kg dried poly(D-lactide) were physically mixed in dry state in a high speed mixer; the mixture was injected into a single screw extruder for melting, the mixture extruded through a metering pump and a spinneret orifice, polylactic acid fibers with 30 μm mean diameter were collected when the spinning temperature was 215° C. and the take-up speed was 500 m/min, and a woven fabric was prepared with a weight of 40 g/m²; the woven fabric was passed through 6 m long and 160° C. constant temperature oven at 12 m/min for thermal treatment of 30 s, guided into 10° C. cold bath for quenching below 55° C. within 5 s, and a wide angle X-ray diffraction (WAXD) measurement showed that the crystallinity of a crystal of the treated woven fabric is 0; the treated woven fabric was immediately immersed into 25° C. dichloroethane for 105 min, pre-pressed at 0.2 MPa to partially remove the solvent, and fully dried at 60° C.; and pressed into a polylactic acid nano-fiber membrane at 0.3 MPa and 25° C. Tests showed that the membrane consists of the polylactic acid nanofibers with 125 nm mean diameter, is insoluble in conventional polylactic acid solvents such as dichloromethane, etc., can maintain stability of dimension and performance at 120° C., and has 30 μm mean thickness, 80% mean porosity factor and 0.55 μm mean pore diameter; a melting peak appeared at about 231° C.; and a WAXD measurement showed that the crystallinity is 75%, 90% of which is the racemic stereocomplex crystal of polylactic acid.

Embodiment 3:

Poly(L-lactide) with 120000 weight-average molecular weight and 99% molar content of L optical isomer, and poly(D-lactide) with 360000 weight-average molecular weight and 96% molar content of D optical isomer were vacuum dried under conditions such as 70±5° C. drying temperature, 16 h drying time and 100 Pa vacuum degree; 95 kg dried poly(L-lactide) and 5 kg dried poly(D-lactide) were physically mixed in dry state in a high speed mixer; the mixture was injected into a single screw extruder for melting, the mixture was extruded through a metering pump and a spinneret orifice, polylactic acid fibers with 10 μm mean diameter were collected when the spinning temperature was 245° C. and the take-up speed was 4500 m/min, and a needle punched nonwoven was prepared with a weight of 15 g/m²; the nonwoven was passed through 6 m long and 180° C. constant temperature oven at 36 m/min for thermal treatment of 10 s, guided into 10° C. cold bath for quenching below 55° C. within 15 s, and a wide angle X-ray diffraction (WAXD) measurement showed that the crystallinity of a crystal of the treated nonwoven is 0; the treated nonwoven was immediately immersed into 135° C. 1,1,2,2-tetrachloroethane for 15 min, and immersed again into 55° C. ethanol for extraction for 1 min, pre-pressed at 0.12 MPa to partially remove the solvent and extraction agent, and fully dried at 70° C.; and pressed into a polylactic acid nano-fiber membrane at 0.2 MPa and 75° C. Tests showed that the membrane consists of the polylactic acid nanofibers with 200 nm mean diameter, is insoluble in conventional polylactic acid solvents such as 1,1,2,2-tetrachloroethane, etc., can maintain stability of dimension and performance at 120° C., and has 5 μm mean thickness, 85% mean porosity factor and 1 μm mean pore diameter; a melting peak appeared at about 233° C.; a the WAXD measurement showed that the crystallinity is 65%, 85% of which is the racemic stereocomplex crystal of polylactic acid.

Embodiment 4:

Poly(L-lactide) with 330000 weight-average molecular weight and 96% molar content of L optical isomer, and poly(D-lactide) with 330000 weight-average molecular weight and 96% molar content of D optical isomer were vacuum dried under conditions such as 70±5° C. drying temperature, 16 h drying time and 100 Pa vacuum degree; 97 kg dried poly(L-lactide) and 3 kg dried poly(D-lactide) were physically mixed in dry state in a high speed mixer; the mixture was injected into a single screw extruder for melting, the mixture was extruded through a metering pump and a spinneret orifice, polylactic acid fibers with 30 μm mean diameter were collected when the spinning temperature was 230° C. and the take-up speed was 3500 m/min, and a needle punched nonwoven was prepared with a weight of 40 g/m²; the nonwoven was passed through 6 m long and 190° C. constant temperature oven at 18 m/min for thermal treatment of 20 s, guided into 8° C. cold bath for quenching below 55° C. within 10 s, and the wide angle X-ray diffraction (WAXD) measurement showed that the crystallinity of a crystal of the treated nonwoven is 0; the treated nonwoven was immediately immersed into 80° C. 1,2-dichloroethane for 60 min, pre-pressed at 0.28 MPa to partially remove the solvent, and fully dried at 80° C.; and pressed into a polylactic acid nano-fiber membrane at 0.3 MPa and 50° C. Tests showed that the membrane consists of polylactic acid nanofibers with 125 nm mean diameter, is insoluble in conventional polylactic acid solvents such as 1,2-dichloromethane, etc., can maintain stability of dimension and performance at 120° C., and has 55 μm mean thickness, 85% mean porosity factor and 0.55 μm mean pore diameter; a melting peak appeared at about 230° C.; and a WAXD measurement showed that the crystallinity is 75%, wherein, 95% of which is the racemic stereocomplex crystal of polylactic acid.

Embodiment 5:

Poly(L-lactide) with 600000 weight-average molecular weight and 93% molar content of L optical isomer, and poly(D-lactide) with 600000 weight-average molecular weight and 93% molar content of D optical isomer were vacuum dried under conditions such as 70±5° C. drying temperature, 16 h drying time and 100 Pa vacuum degree; 95 kg dried poly(L-lactide) and 5 kg dried poly(D-lactide) were physically mixed in dry state in a high speed mixer; the mixture was injected into a single screw extruder for melting, the mixture was extruded through a metering pump and a spinneret orifice, polylactic acid fibers with 10 μm mean diameter were collected when the spinning temperature was 245° C. and the take-up speed was 4500 m/min, and a spunlace nonwoven was prepared with a weight of 15 g/m²; the nonwoven was passed through 6 m long and 200° C. constant temperature oven at 36 m/min for thermal treatment of 10 s, guided into 0° C. cold bath for quenching below 55° C. within 15 s, and the wide angle X-ray diffraction (WAXD) measurement showed that the crystallinity of a crystal of the treated nonwoven is 0; the treated nonwoven was immediately immersed into 135° C. 1,1,2,2-tetrachloroethane for 15 min, immersed again into 55° C. ethanol for extraction for 1 min, pre-pressed at 0.12 MPa to partially remove the solvent and extraction agent, and fully dried at 120° C.; and pressed into a polylactic acid nano-fiber membrane at 0.4 MPa and 75° C. Tests showed that the membrane consists of polylactic acid nanofibers with 200 nm mean diameter, is insoluble in conventional polylactic acid solvents such as 1,1,2,2-tetrachloroethane, etc., can maintain stability of dimension and performance at 120° C., and has 5 μm mean thickness, 80% mean porosity factor and 1 μm mean pore diameter; a melting peak appeared at about 232° C.; and a WAXD measurement showed the crystallinity is 85%, wherein, 85% of which is the racemic stereocomplex crystal of polylactic acid.

Embodiment 6:

Poly(L-lactide) with 60000 weight-average molecular weight and 96% molar content of L optical isomer, and poly(D-lactide) with 330000 weight-average molecular weight and 99% molar content of D optical isomer were vacuum dried under conditions such as 70±5° C. drying temperature, 16 h drying time and 100 Pa vacuum degree; 99 kg dried poly(L-lactide) and 1 kg dried poly(D-lactide) were physically mixed in dry state in a high speed mixer; the mixture was injected into a single screw extruder for melting, the mixture was extruded through a metering pump and a spinneret orifice, polylactic acid fibers with 50 μm mean diameter were collected when the spinning temperature was 215° C. and the take-up speed was 500 m/min, and a needle punched nonwoven was prepared with a weight of 65 g/m²; the nonwoven was passed through 6 m long and 160° C. constant temperature oven at 9 m/min for thermal treatment of 40 s, guided into 0° C. cold bath for quenching below 55° C. within 5 s, and a wide angle X-ray diffraction (WAXD) measurement showed that the crystallinity of a crystal of the treated nonwoven is 0; the treated nonwoven was immediately immersed into 25° C. chloroform for 105 min, pre-pressed at 0.12 MPa to partially remove the solvent, and fully dried at 70° C.; and pressed into a polylactic acid nano-fiber membrane at 0.3 MPa and 25° C. Tests showed that the membrane consists of the polylactic acid nanofibers with 200 nm mean diameter, is insoluble in conventional polylactic acid solvents such as chloroform, etc., can maintain stability of dimension and performance at 120° C., and has 5 μm mean thickness, 85% mean porosity factor and 1 μm mean pore diameter; a melting peak appeared at about 225° C.; and a WAXD measurement showed that the crystallinity is 45%, 85% of which is the racemic stereocomplex crystal of polylactic acid.

Embodiment 7:

Poly(L-lactide) with 330000 weight-average molecular weight and 93% molar content of L optical isomer, and poly(D-lactide) with 60000 weight-average molecular weight and 96% molar content of D optical isomer was vacuum dried under conditions such as 70±5° C. drying temperature, 16 h drying time and 100 Pa vacuum degree; 97 kg dried poly(L-lactide) and 3 kg dried poly(D-lactide) were physically mixed in dry state in a high speed mixer; the mixture was injected into a single screw extruder for melting, the mixture was extruded through a metering pump and a spinneret orifice, polylactic acid fibers with 30 μm mean diameter were collected when the spinning temperature was 230° C. and the take-up speed was 1500 m/min, and a knitted fabric was prepared with a weight of 40 g/m²; the knitted fabric was passed through 6 m long and 170° C. constant temperature oven at 7.2 m/min for thermal treatment of 50 s, guided into 10° C. cold bath for quenching below 55° C. within 10 s, and a wide angle X-ray diffraction (WAXD) measurement showed that the crystallinity of a crystal of the treated knitted fabric was 0; the treated knitted fabric was immediately immersed into 45° C. tetrahydrofuran for 60 min, immersed again into 40° C. ethanol for extraction for 3 min, pre-pressed at 0.2 MPa to partially remove the solvent and extraction agent, and fully dried at 60° C.; and pressed into a polylactic acid nano-fiber membrane at 0.2 MPa and 75° C. Tests showed that the membrane consists of polylactic acid nanofibers with 125 nm mean diameter, is insoluble in conventional polylactic acid solvents such as tetrahydrofuran, etc., can maintain stability of dimension and performance at 120° C., and has 30 μm mean thickness, 80% mean porosity factor and 0.55 μm mean pore diameter; a melting peak appeared at about 226° C.; and a WAXD measurement showed that the crystallinity is 45%, 90% of which is the racemic stereocomplex crystal of polylactic acid.

Embodiment 8:

Poly(L-lactide) with 600000 weight-average molecular weight and 99% molar content of L optical isomer, and poly(D-lactide) with 330000 weight-average molecular weight and 93% molar content of D optical isomer were vacuum dried under conditions such as 70±5° C. drying temperature, 16 h drying time and 100 Pa vacuum degree; 95 kg dried poly(L-lactide) and 5 kg dried poly(D-lactide) were physically mixed in dry state in a high speed mixer; the mixture was injected into a single screw extruder for melting, the mixture was extruded through a metering pump and a spinneret orifice, polylactic acid fibers with 10 μm mean diameter were collected when the spinning temperature was 245° C. and the take-up speed was 2500 m/min, and a needle punched nonwoven was prepared with a weight of 15 g/m²; the nonwoven was passed through 6 m long and 200° C. constant temperature oven at 36 m/min for thermal treatment of 10 s, guided into 0° C. cold bath for quenching below 55° C. within 10 s, and a wide angle X-ray diffraction (WAXD) measurement showed that the crystallinity of a crystal of the treated nonwoven is 0; the treated nonwoven was immediately immersed into 85° C. 1,4-dioxane for 40 min, immersed again into 25° C. water for extraction for 5 min, pre-pressed at 0.28 MPa to partially remove the solvent and extraction agent, and fully dried at 120° C.; and pressed into a polylactic acid nano-fiber membrane at 0.4 MPa and 50° C. Tests showed that the membrane consists of polylactic acid nanofibres with 125 nm mean diameter, is insoluble in conventional polylactic acid solvents such as 1,4-dioxane, etc., can maintain stability of dimension and performance at 120° C., and has 5 μm mean thickness, 75% mean porosity factor and 0.55 μm mean pore diameter; a melting peak appeared at about 229° C.; and a WAXD measurement showed that the crystallinity is 65%, wherein, 90% of which is the racemic stereocomplex crystal of polylactic acid.

Embodiment 9:

Poly(L-lactide) with 330000 weight-average molecular weight and 96% molar content of L optical isomer, and poly(D-lactide) with 600000 weight-average molecular weight and 99% molar content of D optical isomer were vacuum dried under conditions such as 70±5° C. drying temperature, 16 h drying time and 100 Pa vacuum degree; 97 kg dried poly(L-lactide) and 3 kg dried poly(D-lactide) were physically mixed in dry state in a high speed mixer; the mixture was injected into a single screw extruder for melting, the mixture was extruded through a metering pump and a spinneret orifice, polylactic acid fibers with 30 μm mean diameter were collected when the spinning temperature was 245° C. and the take-up speed was 4500 m/min, and a woven fabric was prepared with a weight of 40 g/m²; the woven fabric was passed through 6 m long and 190° C. constant temperature oven at 12 m/min for thermal treatment of 30 s, guided into 0° C. cold bath for quenching below 55° C. within 5 s, and a wide angle X-ray diffraction (WAXD) measurement showed that the crystallinity of a crystal of the treated woven microplush is 0; the treated woven fabric was immediately immersed into 135° C. 1,1,2,2-tetrachloroethane for 15 min, immersed again into 40° C. ethanol for extraction for 3 min, pre-pressed at 0.12 MPa to partially remove the solvent and extraction agent, and fully dried at 60° C.; and pressed into a polylactic acid nano-fiber membrane at 0.2 MPa and 50° C. Tests showed that the membrane consists of polylactic acid nanofibers with 50 nm mean diameter, is insoluble in conventional polylactic acid solvents such as 1,1,2,2-tetrachloroethane, etc., can maintain stability of dimension and performance at 120° C., and has 55 μm mean thickness, 85% mean porosity factor and 0.1 μm mean pore diameter; a melting peak appeared at about 233° C.; and a WAXD measurement showed that the crystallinity is 85%, 95% of which is the racemic stereocomplex crystal of polylactic acid.

Embodiment 10:

Poly(L-lactide) with 60000 weight-average molecular weight and 99% molar content of L optical isomer, and poly(D-lactide) with 60000 weight-average molecular weight and 99% molar content of D optical isomer were vacuum dried under conditions such as 70±5° C. drying temperature, 16 h drying time and 100 Pa vacuum degree; 99 kg dried poly(L-lactide) and 1 kg dried poly(D-lactide) were physically mixed in dry state in a high speed mixer; the mixture was injected into a single screw extruder for melting, the mixture was extruded through a metering pump and a spinneret orifice, polylactic acid fibers with 50 μm mean diameter were collected when the spinning temperature was 215° C. and the take-up speed was 2500 m/min, and a woven fabric was prepared with a weight of 65 g/m²; the woven fabric was passed through 6 m long and 180° C. constant temperature oven at 12 m/min for thermal treatment of 30 s, guided into 10° C. cold bath for quenching below 55° C. within 5 s, and a wide angle X-ray diffraction (WAXD) measurement showed that the crystallinity of a crystal of the treated woven microplush is 0; the treated woven microplush was immediately immersed into 25° C. dichloromethane for 105 min, pre-pressed at 0.2 MPa to partially remove the solvent, and fully dried at 60° C.; and pressed into a polylactic acid nano-fiber membrane at 0.2 MPa and 25° C. Tests showed that the membrane consists of polylactic acid nanofibers with 50 nm mean diameter, is insoluble in conventional polylactic acid solvents such as dichloromethane, etc., can maintain stability of dimension and performance at 120° C., and has 30 μm mean thickness, 75% mean porosity factor and 0.1 μm mean pore diameter; a melting peak appeared at about 227° C.; and a WAXD measurement showed that the crystallinity is 65%, 90% of which is the racemic stereocomplex crystal of polylactic acid.

The invention claimed is:

1. A method for making a membrane of poly (lactic acid) (PLA) having an average thickness between 5 μm and 55 μm, an average porosity between 75% and 85%, an average pore size between 0.1 μm and 1 μm, and comprising PLA nanofibers with an average diameter between 50 nm and 200 nm, wherein said nanofibers contain a crystal phase with a volume fraction between 45% and 85% and the crystal phase contains PLA stereocomplex crystals with a volume fraction between 85% and 95%, which method comprises the steps of:

(1) Drying poly (L-lactic acid) (PLLA) with a weight average molecular weight between 60,000 and 600,000 g/mol and an L-isomer mole concentration between 93% and 99% and drying poly (D-lactic acid) (PDLA) with a weight average molecular weight between 60,000 and 600,000 g/mol and a D-isomer mole concentration between 93% and 99%;

(2) Mixing the dried PLLA with the dried PDLA at a PLLA/PDLA ratio of between 95/5 and 99/1;

(3) Transferring the mixed PLLA/PDLA into a heated melt extrusion and spinning device, producing continuous fibers or nonwovens, and producing woven fabrics or nonwovens with the continuous fibers, wherein in said extrusion and spinning device the spinning temperature is between 215° C. and 245° C., and the take-up speed is between 500 m/min and 4500 m/min, and wherein said fibers have an average diameter between 10 μm and 50 μm, and said woven fabrics or nonwovens have an average weight between 15 g/m$^2$ and 65 g/m$^2$;

(4) Heat treating the woven fabrics or nonwovens at a temperature between 160° C. and 200° C. for a time period between 10 s and 50 s, and quenching the woven fabrics or nonwovens to room temperature within a time period between 5 s and 15 s;

(5) Dipping the heat treated woven fabrics or nonwovens into a solvent for washing at a temperature between 25° C. and 135° C. for a time period between 15 min and 105 min;

(6) Removing the solvent from the woven fabrics or nonwovens and drying;

(7) Pressing the dried woven fabrics or nonwovens under a pressure between 0.2 MPa and 0.4 MPa at a temperature between 25° C. and 75° C. for making the membrane with an average thickness between 5 μm and 55 μm.

2. The method according to claim 1, wherein said PLLA has a weight average molecular weight between 60,000 and 120,000 g/mol and an L-isomer mole concentration between 93% and 99% and said PDLA has a weight average molecular weight between 360,000 and 600,000 g/mol and a D-isomer mole concentration between 93% and 99%.

3. The method according to claim 1, which comprises making said fibers at a take-up speed between 2500 m/min and 4500 m/min.

4. The method according to claim 1, wherein step (4) comprises heat treating the woven fabrics or nonwovens at a temperature between 180° C. and 200° C. for a time period between 10 s and 30 s.

5. The method according to claim 1, which comprises removing the solvent from the woven fabrics or nonwovens by pressing the woven fabrics or nonwovens under a pressure between 0.12 MPa and 0.28 MPa and drying at a temperature between 60° C. and 80° C.

6. The method according to claim 1, which comprises removing the solvent from the woven fabrics or nonwovens by dipping the woven fabrics or nonwovens into an extracting agent at a temperature between 25° C. and 55° C. for a time period between 1 min and 5 min, pressing under a pressure between 0.12 MPa and 0.28 MPa, and drying at a temperature between 60° C. and 120° C.

7. The method according to claim 1, wherein said solvent is dichloromethane, 1,2-dichloroethane, chloroform, oxolane, 1,4-dioxane, 1,1,1,2-tetrachloroethane, or 1,1,2,2-tetrachloroethane.

8. The method according to claim 6, wherein said extracting agent is water or ethanol.

* * * * *